United States Patent [19]

Pampus et al.

[11] 3,860,675

[45] Jan. 14, 1975

[54] PROCESS FOR THE PREPARATION OF BLOCK POLYMERS

[75] Inventors: Gottfried Pampus, Leverkusen; Josef Witte, Koeln; Martin Hoffman, Bergisch, all of Germany

[73] Assignee: Bayer Aktiengesellschaft, Leverkusen, Germany

[22] Filed: Dec. 20, 1973

[21] Appl. No.: 426,489

Related U.S. Application Data

[63] Continuation of Ser. No. 124,933, March 16, 1971, abandoned.

[30] Foreign Application Priority Data

Apr. 9, 1970 Germany............................ 2016840

[52] U.S. Cl.............. 260/887, 252/426, 252/431 R, 252/441, 260/33.4 R, 260/33.4 PQ, 260/33.6 UA, 260/888, 260/889

[51] Int. Cl...... C08d 9/08, C08f 29/12, C08f 41/00

[58] Field of Search....... 260/887, 889, 894, 33.4 R, 260/33.4 PQ, 33.4 UA

[56] References Cited

UNITED STATES PATENTS

| | | | |
|---|---|---|---|
| 3,438,951 | 4/1969 | Van de Castle et al. | 260/80.78 |
| 3,450,797 | 6/1969 | Schafer et al. | 260/888 |
| 3,505,302 | 4/1970 | Natta et al. | 260/80.78 |
| 3,622,653 | 11/1971 | Schuster et al. | 260/881 |
| 3,692,872 | 9/1972 | Calderon et al. | 260/887 |
| 3,821,328 | 6/1974 | Streck et al. | 260/887 |

FOREIGN PATENTS OR APPLICATIONS

| | | | |
|---|---|---|---|
| 1,090,959 | 11/1967 | Great Britain | 260/80.78 |
| 1,098,340 | 1/1968 | Great Britain | 260/80.78 |

*Primary Examiner*—Murray Tillman
*Assistant Examiner*—J. Ziegler
*Attorney, Agent, or Firm*—Connolly and Hutz

[57] ABSTRACT

A process for the preparation of sequence polymers from at least two polymers which contain C=C-double bonds, wherein at least two polymers which contain C=C-groups are treated in the liquid phase with a mixed catalyst of a. a compound of a metal of group V$b$ or VI$b$ of the periodic system, and b. an organic compound of a metal of groups I$a$ to III$a$ of the periodic system and co-catalyst of epoxides or halogenated alcohols.

8 Claims, No Drawings

PROCESS FOR THE PREPARATION OF BLOCK POLYMERS

CROSS-REFERENCE TO RELATED APPLICATION

This application is a continuation of application Ser. No. 124,933 filed Mar. 16, 1971 and now abandoned.

The invention relates to a process for the preparation of block copolymers from at least two polymers which contain C = C-double bonds, wherein at least two polymers which contain C = C-double bonds are treated in the liquid phase with a catalyst of a. a compound of a metal of groups V$b$ or VI$b$ of the periodic system[1] and b. an organic compound of a metal of groups I$a$ to III$a$ of the periodic system.[1]

[1]The periodic system of the elements referred to is printed in "Handbook of Chemistry and Physics," 47$^{th}$ edition (1966), page B-3.

Block copolymers in accordance with the present invention are polymers of the form

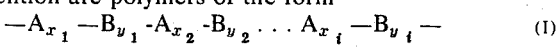  (I)

in which $A_{x_i}$ and $B_{y_i}$ denote parts of the original polymers $A_m$ and $B_n$. A and B symbolise the monomeric structural units of the starting polymers, $m$ and $n$ their original degree of polymerisation and $x_i$ and $y_i$ the degree of polymerisation of the chain parts which are incorporated in the block copolymer.

In principle any polymers which contain C = C-double bonds are suitable for use as starting polymers for carrying out the process. It is preferable to use those which are free from groups which inactivate the catalyst (e.g. OH—, COOH- or SO$_3$H-groups). It is particularly advantageous to use those polymers which contain groups of the form —CH=CH— or —CH=CH$_2$.

The following are examples of suitable starting polymers: polybutadiene, copolymers of butadiene with styrene, acrylonitrile, acrylic acid esters or methacrylic acid esters (preferably tert. butyl esters), polypentenamers, polypiperylene and ethylene propylene terpolymers which contain as their third component diolefines such as hexa-1,5-diene, hexa-1,4-diene, dicyclopentadiene or ethylidene norbornene. Copolymers of norbornadiene with the above mentioned monomers or with ethylene or vinyl dichloride are also suitable.

According to the invention, at least two different polymers must be reacted together in the presence of the catalyst. They may be used in any proportions. In general, no component should be used in a quantity of less than 0.5 percent by weight, so that the proportion by weight in which the two components are mixed is in the range of 1:200 to 200:1. In a two-component system, it is advantageous to use 5.0 to 30 percent of one component and 95 — 70 percent of the other, but one may also react more than two components with each other and in that case again it is advantageous to use one component in quantities of 5.0 to 30 percent by weight whilst the two others may be present in any proportion to each other.

The process may generally be carried out by dissolving the starting polymers in an inert organic solvent and adding the catalyst to the solution. The quantity of catalyst generally corresponds to 0.1 to 4 mMol of the metal of group V$b$ or VI$b$ per 100 g of polymer mixture. The reaction may be carried out at temperatures of between −60°C and +60°C and is preferably carried out at temperatures of between −20° and +30°C. It is generally completed in about 0.5 to 6 hours but reaction times of only a few minutes may sometimes be sufficient.

Suitable solvents for carrying out the process are aliphatic hydrocarbons such as butane, pentane, hexane or iso-octane or cycloaliphatic compounds such as cyclohexane or aromatic hydrocarbons such as benzene, toluene or xylene. The concentration of the polymers in these solvents is preferably kept between 5 and 30 percent. No separate solvent need be used if one of the polymers used for the reaction is already liquid. In that case, the other polymer or polymers is or are dissolved in the liquid polymer, and the reaction is carried out in this solution. It is especially advantageous to use solutions of polymers which have been obtained by the polymerisation of conjugated diolefines, if desired in admixture with aromatic vinyl compounds such as styrene, with metal alkyls or with organometallic mixed catalysts.

The catalyst must be inactivated at the end of the reaction as is customary in polymerisation. This may be done by the addition of compounds which have an acidic hydrogen atom, for example alcohols. The block polymer may be isolated from the inactivated solution either by precipitation, e.g., with alcohols such as methanol or ethanol, or by steam distillation. The block polymers obtained are suitable for use as rubbers, high impact strength compounds or their precursors, drying oils, resins or adhesives.

According to one preferred embodiment of the process, the ring opening polymerisation of cycloolefines is combined with the preparation of the sequence polymers. In this case, a cycloolefine, preferably one having 5 to 20 carbon atoms and more particularly cyclopentene, is polymerised in solution in one of the above mentioned organic solvents by means of the catalyst mentioned above. Another polymer which has C = C-double bonds is then dissolved in the resulting solution of polyalkenamer and the process according to the invention is carried out.

Catalysts obtained from compounds of metals of groups V$b$ and VI$b$ of the periodic system and organometallic compounds of metals of groups I$a$ – III$a$ of the periodic system are suitable for the process. The catalysts are preferably chosen from among the following:

a. halides, oxyhalides and alkoxyhalides of tungsten, tantalum or molybdenum, such as fluorides, chlorides, bromides, iodides, e.g. WCl$_6$, WBr$_5$, WCl$_4$O,- MoCl$_5$, TaCl$_5$, TaOcl$_3$ or TaBr$_5$ and halogen b. organic aluminium compounds such as aluminium trialkyls, (preferably having 1 to 12 carbon atoms) e.g. Al(C$_2$H$_5$)$_3$, Al(C$_8$H$_{17}$)$_3$, Al(isoC$_4$H$_9$); aluminium haloalkyls, (alkyl preferably from 1 to 12 carbon atoms, halogen preferably chlorine and bromine), e.g. Al(C$_2$H$_5$)$_2$Cl, Al(C$_2$H$_5$)$_2$Br, or Al(C$_2$H$_5$)Cl$_2$ and aluminium oxyalkyls (preferably having 1 to 12 carbon atoms in the alkoxy group) and aluminium alkyl-oxyalkyls such as Al(C$_2$H$_5$)$_2$OC$_2$H$_5$.

Tungsten halides (e.g. chlorides, bromides, fluorides and iodides), tungsten oxyhalides (preferably chlorides and bromides), and alkoxy tungsten halides (preferably chlorides and bromides also containing alkoxy radicals having 1 to 12 carbon atoms) are especially advantageous.

The molar ratio of a) to b) may vary between 1:0,5 and 1:15. The activity of the catalysts may be increased by the use of cocatalysts. These may be added in the proportion of a):co-catalysts as 1:0.3 to 1:10. The following are examples of such co-catalysts:

1. Epoxides of the general formula

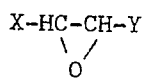

X = a hydrogen atom or an alkyl, aryl or aralkyl group
Y = a hydrogen atom or an alkyl, aryl, aralkyl —$CH_2$-Hal, (Hal-Cl, Br or I) or —$CH_2$—O—R group (R = alkyl, aryl);

2. Halogenated alcohols of the general formula

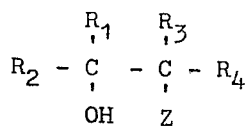

in which Z represents a chlorine, bromine or iodine atom, $R_1$ and $R_2$, which may be the same or different, represent a hydrogen atom or an alkyl, aryl or alkylaryl radical, $R_3$ and $R_4$, which may be the same or different, represent a chlorine, bromine, iodine or hydrogen atom or an alkyl, aryl or alkaryl radical, and $R_1$ and $R_3$ together with the carbon atoms to which they are attached may form a 5-membered or larger hydrocarbon ring and/or phenols of the general formula

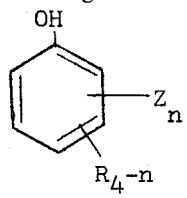

in which X has the meaning given above, R represents hydrogen an alkyl, aryl or a condensed aromatic radical and n denotes 1 to 4. In the above definitions of X, Y, $R_1$-$R_4$, R alkyl radicals are understood to be preferably straight chain or branched alkyls having 1 to 12 carbon atoms, aryl means preferably phenyl, naphthyl, biphenyl and aralkyl and alkaryl represent a combination of the radicals mentioned above. When preparing these catalysts, the tungsten salt may be reacted with the co-catalyst. In that case, the reaction is carried out in hydrocarbons as solvents, preferably the same solvent in which the polymerisation is carried out, and approximately 0,05 to 0,5 molar solutions are used.

The quantity of catalysts generally corresponds to 0.1 to 4 mMol of the metal of group Vb or VIb per 100 g of monomer.

In the following Examples percentages are by weight, viscosities are intrinsic viscosities [$\eta$] determined at 25°C in toluene.

EXAMPLE 1

200 g of cyclopentene were polymerised in 900 g of toluene as solvent in a vessel equipped with stirrer with the exclusion of air and moisture. 4.0 millimol of the reaction product of $WCl_6$ with 2 mols of epichlorohydrin and 12.0 millimols of aluminium diethyl chloride were used as catalyst. Approximately 60 percent conversion was obtained after a polymerisation time of 2 hours at −5°C. At that point, the solution contained a trans-polypentenamer with a trans-content of 91 percent and had a solution viscosity of 2.4 (determined at 25°C in toluene). 200 g of a 10 percent by weight solution of a polybutadiene having a solution viscosity of 2.7 were added to this solution with stirring. After 2 hours, the sequence polymer was isolated by the usual method of precipitation with ethanol with the addition of stabiliser. The product was found to have an intrinsic viscosity [$\eta$] of 2.0 at 25°C in toluene and consisted of 86 percent of 1,5-trans-polypentenamer sequences and 14 percent of polybutadiene sequences.

The polybutadiene for this experiment was prepared by polymerisation of butadiene with lithium butyl in the presence of glycol dimethyl ether and contained 78 percent of its double bonds in the 1,2-position, 16 percent in the 1,4-trans-configuration and 6 percent in the 1,4-cis-configuration.

EXAMPLE 2

200 g of cyclopentene were polymerised as described in Example 1. 2.0 millimol of the reaction product of $WCl_6$ with 2 mols of epichlorohydrin and 12.0 millimol of aluminium diethyl chloride were used as catalyst. 100 g of 1,5-trans-polypentenamer having an [$\eta$]-value of 1,8 (25°C, toluene) were obtained after a polymerisation time of 2 hours at −5°C, as determined in a comparison test. 200 g of a 10 percent by weight solution of polybutadiene ([$\eta$]-value 2,4 at 25°C in toluene; cis-content 97 %) were added to the polymer solution which still contained active catalyst, and the mixture was stirred for 2 hours at +5°C. After the reaction mixture had been worked up, a sequence polymer was obtained which consisted of 16 percent of polybutadiene and 84 percent of polypentenamer and which had an [$\eta$]-value of 1.3 (25°C, toluene).

EXAMPLE 3

200 g of 1,5-trans-polypentenamer [$\eta$] (toluene 25°C) = 1.8 and 200 g of cis-1,4-polybutadiene [$\eta$] (toluene 25°C) = 2.2 are dissolved in 2,500 ml of toluene with the exclusion of oxygen and moisture. 40 ml of a 0.2 molar solution of a reaction product of tungsten hexachloride and epichlorohydrin (in the molar ratio of 1:2) in toluene are added at room temperature and the mixture is cooled to +5°C. 24 ml of a molar solution of diethyl aluminium chloride are added with stirring. Stirring is continued for 1 hour at +5°C. the catalyst is inactivated by the addition of 10 ml of ethanol, and 5 g of 2,6-di-tert.-butyl-4-methylphenol are added as stabiliser. After precipitation with ethanol and drying at 50°C under vacuum, the sequence polymer is obtained in quantitative yield. The product has an intrinsic viscosity [$\eta$] in toluene at 25°C of 0.76.

EXAMPLE 4

The procedure was the same as described in Example 3 but the reaction time was only 5 minutes. The sequence polymer, which was obtained in quantitative yield, had an intrinsic viscosity [$\eta$] in toluene at 25°C of 1.05.

EXAMPLE 5

100 g of 1,5-trans-polypentenamer, [$\eta$] (toluene, 25°C) = 1.8, and 100 g of polybutadiene (78 percent of vinyl double bonds, [$\eta$] (toluene, 25°C) = 1.9) are dissolved in 1300 ml of toluene with the exclusion of oxygen and moisture. 20 ml of a 0.2 molar solution of a reaction product of tungsten hexachloride and epichlorohydrin (in the molar ratio of 1:2) in toluene are added at room temperature with stirring. The reaction mixture is then cooled to +5°C and 12 ml of a molar solution of diethyl aluminium chloride in toluene are added with vigorous stirring. Stirring is continued for one hour at +5°C and the catalyst is inactivated by the addition of 10 ml of ethanol and 5 g of 2,6-di-tert.-butyl-4-methylphenol are added as stabilizer. The sequence polymer is isolated by precipitation with ethanol and dried under vacuum at 50°C. The product has a viscosity number $[\eta]$ in toluene at 25°C of 1.59.

EXAMPLE 6

150 g of 1,5-trans-polypentenamer, $[\eta]$ (toluene, 25°C) = 1.8, and 50 g of a block copolymer of butadiene and styrene (50:50), $[\eta]$ (toluene, 25°C) = 1.2 are dissolved in 1300 ml of toluene with exclusion of oxygen and moisture. The process is carried out as described in Example 5 for a reaction time of 10 minutes. After isolation of the product and drying a sequence polymer which has an intrinsic viscosity $[\eta]$ in toluene at 25°C of 0.75 is obtained in quantitative yield.

We claim:
1. A process for producing block copolymers from at least two different polymers which each have —CH=CH$_2$ or —CH=CH— groups, said process comprising dissolving said different polymers in an inert organic solvent and treating resulting solution at a temperature of −60° to 60°C. with a catalytic amount of a catalyst of
   a. a halide, oxyhalide or alkoxy halide of tungsten, tantalum or molybdenum,
   b. aluminum trialkyl, aluminum haloalkyl, aluminum oxyalkyl or aluminum alkoxyalkyl and
   c. a member selected from the group consisting of epihalohydrin wherein halo is chlorine, bromine or iodine and an halogenated alcohol of the formula

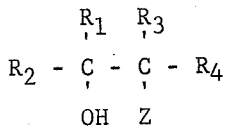

wherein Z is chlorine, bromine or iodine; R$_1$ and R$_2$ are hydrogen, alkyl, phenyl, naphthyl, biphenyl, alkylphenyl, alkylnaphthyl, or alkylbiphenyl; R$_3$ and R$_4$ are hydrogen, chlorine, bromine, iodine, alkyl, phenyl, naphthyl, biphenyl, alkylphenyl, alkylnaphthyl or alkylbiphenyl and R$_1$ and R$_3$ when taken together with the carbon atom to which they are attached form a five-membered hydrocarbon ring, said alkyl and alkoxy moieties having from 1 to 12 carbon atoms; catalyst constituents (a) and (b) being in a molar ratio of 1:0.5 to 1:15 and catalyst constituents (a) and (c) being in a molar ratio of 1:0.3 to 1:10.

2. The process as claimed in claim 1 wherein each of said polymers is selected from the group consisting of polybutadiene; butadiene copolymers with styrene, acrylonitrile, acrylic acid esters or methacrylic acid esters; polypentenamers; polypiperylene; ethylene-propylene terpolymers and norbornadiene copolymers.

3. The process of claim 1 wherein not less than 0.5 percent by weight of any one polymer component is employed.

4. The process as claimed in claim 1 in which 5 to 30 percent by weight of one polymer component and 95 to 70 percent by weight of the remaining polymer component or components are employed.

5. The process of claim 1 wherein said temperature is from −20° to 30°C.

6. The process of claim 1 wherein 0.1 to 4 mmols of (a) are employed per 100 g of polymers.

7. The process of claim 1 wherein one of said polymer components is a polypentenamer.

8. The process of claim 1 wherein cyclopentene is initially polymerized in an inert organic solvent in the presence of said catalyst to form polypentenamer and subsequently at least one other polymer having —CH=CH$_2$ or —CH=CH— groups is added and the resulting mixture is polymerized in the presence of said catalyst to form said block copolymer.

* * * * *